United States Patent [19]
Ludwig et al.

[11] 3,782,737
[45] Jan. 1, 1974

[54] SPIRAL GROOVE SEAL

[75] Inventors: Lawrence P. Ludwig, Fairview Park; Thomas N. Strom, North Olmsted, both of Ohio

[73] Assignee: The United States of America as represented by the Administrator of the National Aeronautics and Space Administration, Washington, D.C.

[22] Filed: Jan. 24, 1972

[21] Appl. No.: 220,251

Related U.S. Application Data

[60] Division of Ser. No. 54,540, July 13, 1970, Pat. No. 3,675,935, which is a continuation-in-part of Ser. No. 723,465, April 23, 1968, abandoned.

[52] U.S. Cl. ................................ 277/27, 277/91
[51] Int. Cl. ........................................ F16j 15/34
[58] Field of Search .............. 277/3, 27, 96, 74, 277/88, 134, 133, 25, 91

[56] References Cited
UNITED STATES PATENTS 3,109,658  11/1963  Barrett et al. .................. 277/96 X
3,499,653  3/1970   Gardner ........................... 277/96 X
3,527,465  9/1970   Guinard ........................... 277/96 X
2,354,478  7/1944   Reinhardt et al. ............... 277/88 X
3,675,935  7/1972   Ludwig et al. ..................... 277/25

FOREIGN PATENTS OR APPLICATIONS
1,009,940  11/1965  Great Britain ....................... 277/74

*Primary Examiner*—Samuel B. Rothberg
*Attorney*—N. T. Musial et al.

[57] ABSTRACT

Mating flat surfaces inhibit leakage of a fluid around a stationary shaft. A spiral groove pattern produces a pumping action toward the fluid when the shaft rotates which prevents leakage while a generated hydraulic lifting force separates the mating surfaces to minimize wear. Provision is made for placing these spiral grooves in communication with the fluid to accelerate the generation of the hydraulic lifting force.

7 Claims, 4 Drawing Figures

SPIRAL GROOVE SEAL

RELATED APPLICATION

This application is a division of copending application Ser. No. 54,540, filed July 13, 1970, and now U.S. Pat. No. 3,675,935 which, in turn, is a continuation-in-part of application Ser. No. 723,465, filed Apr. 23, 1968 and now abandoned.

STATEMENT OF GOVERNMENT OWNERSHIP

The invention described herein was made by employees of the United States Government and may be manufactured and used by or for the Government for governmental purposes without the payment of any royalties thereon or therefor.

BACKGROUND OF THE INVENTION

This invention is concerned with sealing a rotating shaft with a minimum amount of wear. The invention is particularly directed to a low leakage shaft seal which can be used with many types of liquids, such as water, sodium, and oil.

Helical groove viscoseals and face contact seals have been used with rotating shafts. Leakage has been encountered with both types of seals. When a shaft having a viscoseal stops rotating the seal ceases to function. Leakage results from a lack of positive pumping action in a radial contact face seal.

Other problems encountered in sealing rotating shafts in modern devices are the result of high liquid temperatures, limited weight requirements, and extremely low leakage rate allowances. Many such devices require a high degree of reliability over long periods of unattended operation.

SUMMARY OF THE INVENTION

The aforementioned problems have been solved by using a rotating seal seat having a spiral groove pattern arranged such that movement of the seal seat causes the grooves to produce a pumping action against the sealed fluid pressure. Fluid is pumped back as fast as it leaks out. The spiral groove geometry pattern provides a hydrodynamic lifting force which produces a positive separation of radial sealing surfaces when the shaft rotates. Engagement of these surfaces prevents leakage when the shaft is stationary, and separation of these surfaces when the shaft is rotating reduces wear.

OBJECTS OF THE INVENTION

It is, therefore, an object of the present invention to provide a low leakage seal having a long operating life.

Another object of the invention is to provide positive contact sealing at static conditions when there is no rotation or movement.

A further object of the invention is to provide a seal having positve separation of the sealing surfaces in the operating mode.

These and other objects and advantages of the invention will be apparent from the specification that follows and from the drawing wherein like numerals are used throughout to identify like parts.

IN THE DRAWINGS

DESCRIPTION

Figure 1:
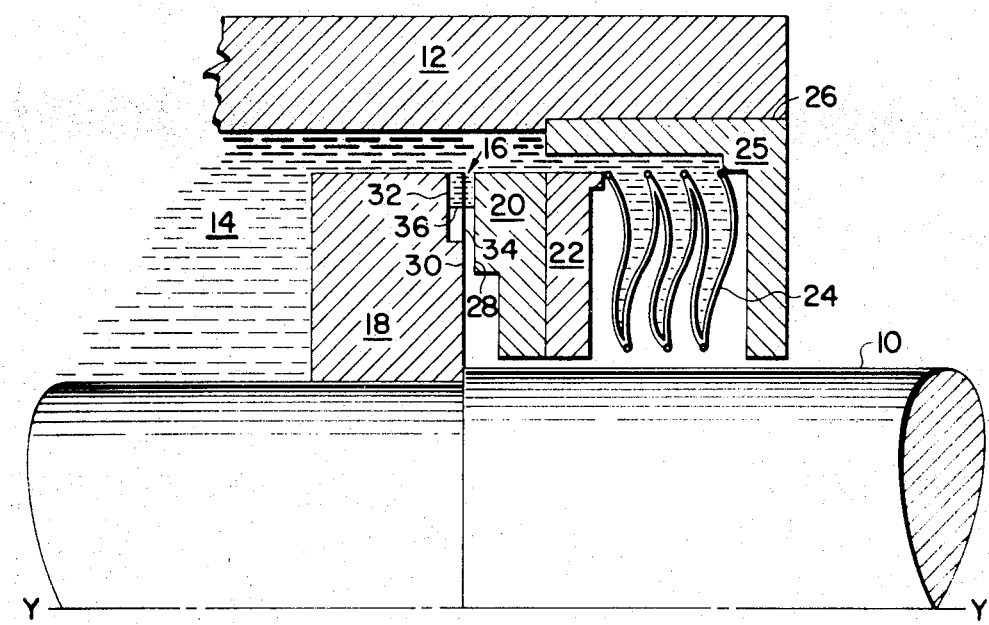
FIG. 1 is an axial quarter section of a seal constructed in accordance with the present invention showing the relative position of the various parts when the shaft is rotating.

In the embodiment shown in FIG. 1 a shaft 10 extends into a container 12 of liquid 14. The shaft 10 is rotatable about its normal axis Y–Y' and may be used to transmit torque from motor to a pump. The liquid 14 may be an alkali metal, such as sodium, at a high temperature. Loss of the liquid 14 from the container 12 is prevented by a seal 16 constructed in accordance with the present invention.

The seal 16 incorporates a rotatable seat 18 in the form of a shoulder on the shaft 10. The seal 16 further includes a nosepiece 20 in the form of a ring member through which the shaft 10 extends. The nosepiece 20 is mounted on a sleeve 22 which is secured to one end of a bellows 24. The opposite end of the bellows 24 is attached to a flange 25 on a tubular housing 26 that is secured to the container 12. The liquid 14 is outside the bellows 24 and a gas, such as air, is inside the bellows around the shaft 10. The bellows 24 prevents the rotation of the sleeve 22 while biasing the nosepiece 20 towards the seat 18. The bellows 24 provides a mechanical spring force and functions as a secondary seal to accommodate axial motion of the sleeve 22.

The nosepiece 20 has a radially extending surface 28 and the seat 18 has a mating surface 30. The surfaces 28 and 30 are maintained in sealing engagement by the biasing action of the bellows spring force and by hydraulic pressure when the shaft 10 is stationary. The dam formed by the sealing engagement of the surfaces 28 and 30 prevents leakage of the liquid 14, and these surfaces are preferably optically flat for best results.

A plurality of grooves 32 are chemically etched into the seat 18 outward from the dam formed by the engagement of the surfaces 28 and 30. The grooves 32 have a spiral configuration similar to the grooves shown in FIG. 4 and are separated by lands 34 that are coplanar with the sealing surface 30.

Rotation of the shaft 10 produces a pumping action by the spiral grooves 32. This pumping is accompanied by a hydraulic lifting force at the lands 34 which moves the surfaces 28 and 30 out of engagement thereby forming a gap shown in FIG. 1. This hydraulic lifting force maintains the gap between the surfaces 28 and 30 while the pumping prvents leakage of the liquid 14. A liquid-gas interface 36 shown in FIG. 1 is formed between the seat 18 and the nosepiece 20. The prevention of leakage is further aided by centrifugal force.

It may also be desirable to form the spiral grooves in the axially movable nosepiece instead of in the rotatable seat. In such an embodiment the grooves would have a configuration that would pump toward the liquid in the container. It is further contemplated that grooves may be used simultaneously on both the seat and the nosepiece.

Passages may be provided in the nosepiece or seat to meter leakage flow into the spiral grooves and extend lubrication over a greater area of the lands. A liquid-gas interface is formed in the grooves and a similar interface is formed on the land. This serves to increase the load carrying capacity of the seal.

Figure 2:
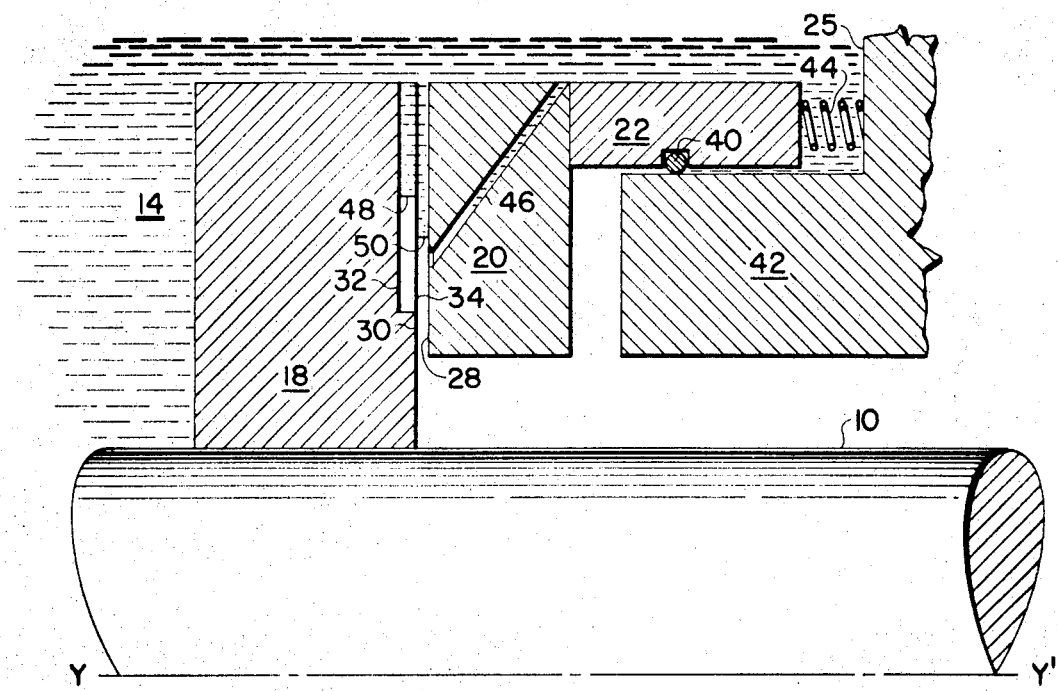
FIG. 2 is an axial quarter section showing an alternate embodiment of the seal.

In the embodiment shown in FIG. 2 these principles have been utilized to provide a liquid lubricated seal for minimizing gas leakage in a turbine or the like. The seal is balanced so that the spring forces and pressure forces function in the manner previously described. The nosepiece is prevented from contacting the seal seat during rotation by a thin film of liquid on the lands separating the grooves. The thickness of the liquid film is controlled by the pumping action of the grooves and by the force balance on the nosepiece.

Referring now to FIG. 2 a sealing ring 40 such as a metal "O" ring is interposed between the sleeve 22 and the outer wall of a circular protrusion 42 on the flange 25. The ring 40 prevents leakage of the liquid 14. A spring 44 biases the sleeve 22 toward the rotatable seat 18. It will be appreciated that the sealing ring 40 and the spring 44 perform the same function as the bellows 24 shown in FIG. 1.

In the embodiment shown in FIG. 2 liquid is introduced to the spiral grooves 32 through passages 46 which extend through the nosepiece 20. Each passage 46 places a mating groove 32 in communication with the liquid 14 that is under pressure. When the shaft 10 is stationary the seal operates in the manner previously described in connection with the embodiment shown in FIG. 1. When the shaft 10 is rotated each groove 32 tends to pump liquid from its matin passage 46 at a faster rate than it is supplied. In this manner the grooves 32 are only partially filled and a liquid-interface 48 is formed in each groove 32.

Relative motion at the sealing interface introduces a drag flow which tends to force the liquid toward the leading edge of each land 34. Some of this liquid escapes over the land 34 and provides a liquid film separation between the seal seat 18 and the nosepiece 20. Also a second liquid-gas interface 50 is formed over the land 34.

The continuous flow of lubricating liquid from the passage 46 through the sealing interface 50 serves to cool the seal. Fluid shear in the film over the land 34 results in a discontinuous type of heat input to any one fluid particle. Therefore, while a particular fluid particle is passing over a land area it is performing part of the total lubricating function and experiences heat input due to fluid shear.

In the next sequence of events the fluid particle leaves the thin film region over the land 34 and enters the next spiral groove 32. Here it can mix with the cooler liquid and undergo a reduction in temperature before passing over the next land. The number of times a liquid particle passes over a land area before being expelled from the sealing interface is a function of seal design. It is contemplated this embodiment of the invention can be used in clutches or clutch plates.

Figure 3:
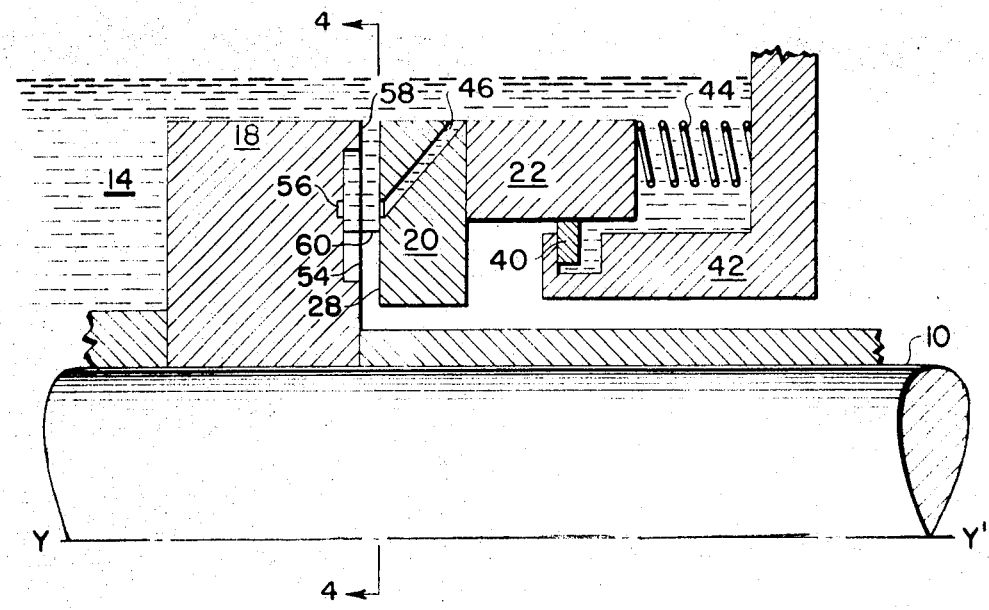
FIG. 3 is a partial sectional view showing still another embodiment of the invention.
Figure 4:
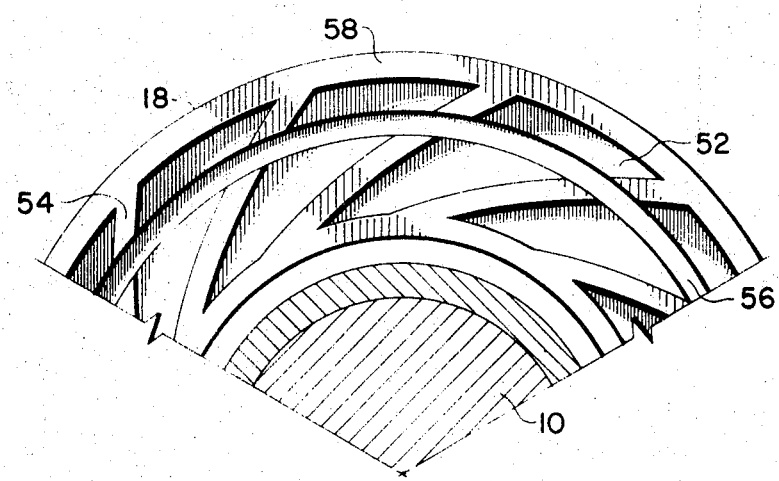
FIG. 4 is an elevation view of the rotating seat taken along the line 4—4 in FIG. 3.

The embodiment shown in FIGS. 3 and 4 utilizes spiral grooves 52 formed in the seat 18. The grooves 52 are separated by lands 54 as in the previous embodiments. Liquid 14 is introduced to the spiral grooves 52 through passages 46 which extend through the nosepiece 20 in the manner previously described in connection with the embodiment shown in FIG. 2.

A circular feed groove 56 formed in the bottom of the grooves 52 passes through the lands 54. This circular feed groove 56 is in alignment with the passages 46. The feed groove 56 insures equal pressure in the grooves 52. A circular feed groove having a depth of about 0.010 inch has been satisfactory.

An important feature of the invention is the provision of a circular dam 58 about the rotating seat 18. When the shaft 10 is stationary the seal operates in the same manner as the previously described embodiments. The pressure balance made up of the force of the spring 44 together with the pressure force exerted by the liquid 14 is such that the seal is closed when the shaft 10 is stationary.

When the shaft 10 rotates a liquid-gas interface 60 is formed within the inner portion of the spiral pattern. The pressure at the feed groove is approximately the same as the pressure at the adjacent land. The spiral configuration increases the pressure from that of the liquid 14 to a maximum at the junction of the spiral and the outer dam 58.

The pumping effort of the spiral pattern produces an opening force to balance the seal closing force. The height of the sealing gap is a function of the closing force and the pressure generation capacity of the spiral patterns. The film thickness is greater for a spiral-feed groove seal shown in FIGS. 3 and 4 than that of the spiral groove seal as shown in FIG. 1. With the spiral groove seal, the lift or film thickness is due to hydrodynamic forces over the land areas. With the spiral-feed groove seal shown in FIGS. 3 and 4 the lift is caused by hydrodynamic forces generated within the groove and across the dam 58.

What is claimed is:

1. Apparatus for forming a seal about a rotatable shaft extending into a container of liquid comprising
   a pair of juxtaposed members extending about said shaft adjacent said liquid, one of said members comprising a seat mounted on said shaft for rotation therewith and the other of said members comprising a tubular member mounted for reciprocable movement along said shaft,
   mating surfaces on said members, one edge of each of said surfaces being in contact with said liquid and the opposite edge being exposed to ambient pressure,
   means for biasing said tubular member toward said seat for moving said surfaces into sealing engagement when said shaft is stationary,
   spiral grooves in said seat at its mating surface, said spiral groove being separated by lands substantially coplanar with said mating surface whereby rotation of said shaft pumps a portion of said adjacent contained liquid between said lands to generate a hydraulic lifting force thereby separating said members in opposition to said basing means while inhibiting leakage, and
   passage means in one of said members for placing said spiral grooves in communication with said contained liquid to accelerate the generation of said hydraulic lifting force.

2. Apparatus for forming a seal about a rotatable shaft as claimed in claim 1 wherein the contained liquid is located outwardly of said grooves so that the pumping of said liquid is aided by centrifugal force.

3. Apparatus for forming a seal about a rotatable shaft as claimed in claim 1 wherein the passage means comprises
   a plurality of passages extending through said tubular member for directing liquid into said spiral grooves.

4. Apparatus for forming a seal about a rotatable shaft as claimed in claim 3 including a feed groove in communication with each of said passages, said feed groove being cut in the bottom of said spiral grooves and extending through said lands.

5. Apparatus for forming a seal about a rotatable shaft as claimed in claim 1 including a dam surrounding the grooves to increase the hydrodynamic lifting force when the shaft is rotated.

6. Apparatus for forming a seal about a rotatable shaft as claimed in claim 5 wherein the passage means comprises a plurality of passages extending through said tubular member for placing the grooves in communication with the liquid in the container.

7. Apparatus for forming a seal about a rotatable shaft as claimed in claim 6 including a feed groove aligned with said passages, said feed groove being cut in the bottom of said spiral grooves and extending through said lands.

* * * * *